M. PHILLIPS.
Cheese-Cutters.
No. 158,518. Patented Jan. 5, 1875.
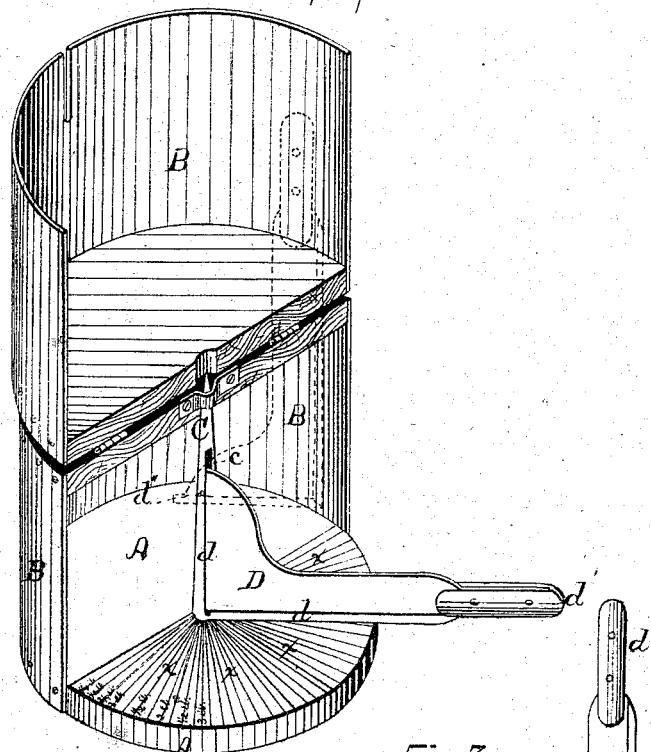
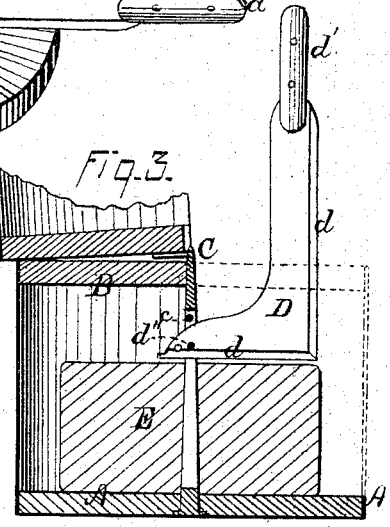
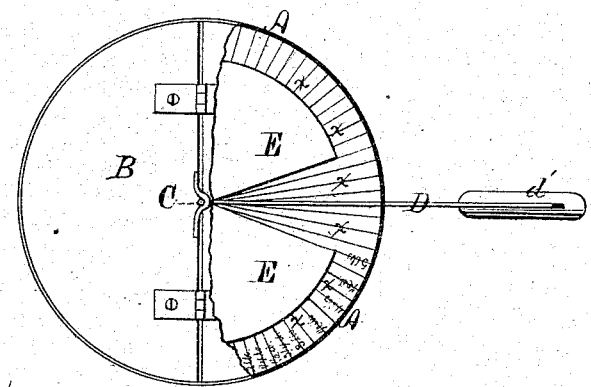
Witnesses:
Jas. E. Hutchinson
John R. Young
Inventor:
M. Phillips, by
Prindle and Loy his Attys

UNITED STATES PATENT OFFICE.

MOREAU PHILLIPS, OF SPRINGFIELD, ILLINOIS.

IMPROVEMENT IN CHEESE-CUTTERS.

Specification forming part of Letters Patent No. 158,518, dated January 5, 1875; application filed October 30, 1874.

*To all whom it may concern:*

Be it known that I, MOREAU PHILLIPS, of Springfield, in the county of Sangamon and in the State of Illinois, have invented certain new and useful Improvements in Cheese Boxes and Cutters; and do hereby declare that the following is a full, clear, and exact description thereof, reference being had to the accompanying drawing, making a part of this specification, in which—

Figure 1 is a perspective view of my improved device, its casing being opened to show the interior construction of parts. Fig. 2 is a plan view of the upper side of the same when in use, the top of the casing being removed; and Fig. 3 is a vertical central section of said device upon line $x\ x$ of Fig. 2.

Letters of like name and kind refer to like parts in each of the figures.

The design of this invention is to enable a cheese to be neatly and easily cut into pieces having any desired weight; and it consists in the peculiar construction of the knife and its combination with the cheese-box, substantially as and for the purpose hereinafter specified.

In the annexed drawings, A represents the base or bottom of my cheese-box, which is constructed from wood in a circular form, and is inclosed at its upper side and edge by means of a casing, B, which casing is constructed, from any suitable material, in the form of a cylinder, inclosed at its upper end, and, for convenience, is divided vertically and centrally, the sections thus formed hinged together, and one of said sections permanently attached at its lower edge to or upon the contiguous edge of said base, such arrangement enabling said casing to be opened, as shown in Figs. 1 and 3. At the radial center of the casing is placed a metal bar, C, which is loosely confined in a vertical position, so as to turn freely within its bearings. Within a vertical central slot, $c$, in the bar C is pivoted the upper end of a knife, D, which knife has two cutting-edges, $d$ and $d$, that have lines at right angles to each other. A handle, $d'$, attached to the outer end of said knife enables the same to be moved vertically upon its pivotal bearing $d''$, or horizontally with the journaled bar C.

The device thus constructed is used as follows: The pivotal bearing $d''$ is removed, the knife D withdrawn from the bar C, and the latter removed, through the bottom A, from the casing. A cheese, E, is now placed centrally within the casing, and the bar C forced upward through the center of said cheese (being pointed at its upper end for this purpose) and into its bearings, after which the cutter D is replaced within said bar, said cutter then occupying the position shown in Fig. 3.

When it is desired to cut the cheese, the cutter is moved downward until its lower edge rests upon the base or bottom of the casing, when it is again raised and turned to the right or left the necessary distance, and again forced downward through the cheese, the result being the separation from the latter of a wedge-shaped piece, the sides of which are true radial lines.

For convenience in gaging the weight of the piece severed, a series of radial lines, $x\ x$, are provided upon the base A, which lines correspond in relative distance to the thickness of any desired portion, by weight, of a cheese having an average size and shape. The lines $x\ x$ may, if desired, be suitably marked; but such designation is not deemed essential.

The device thus constructed affords a convenient means whereby cheese may be stored and cut without waste; it is simple, and can be furnished at a comparatively small cost.

Having thus fully set forth the nature and merits of my invention, what I claim as new is—

In combination with the cheese-box A B, and with the slotted bar C journaled therein, the knife D, having two cutting-edges, $d$ and $d$, relatively arranged substantially as and for the purpose specified.

In testimony that I claim the foregoing I have hereunto set my hand this 30th day of September, 1874.

MOREAU PHILLIPS.

Witnesses:
M. J. PHILLIPS,
A. S. MORGAN.